United States Patent [19]

Shiobara

[11] Patent Number: 5,699,519
[45] Date of Patent: Dec. 16, 1997

[54] DATA TRANSMISSION METHOD AND APPARATUS APPLICABLE TO NETWORK SYSTEM

[75] Inventor: Yasuhisa Shiobara, Tokyo, Japan

[73] Assignee: Kabushiki Kaisha Toshiba, Kawasaki, Japan

[21] Appl. No.: 503,743

[22] Filed: Jul. 18, 1995

[30] Foreign Application Priority Data

Jul. 19, 1994 [JP] Japan ................................. 6-167087

[51] Int. Cl.⁶ ................................................ G06F 13/376
[52] U.S. Cl. ........................ 395/200.11; 395/200.15; 370/235; 370/230
[58] Field of Search ....................... 395/200.11, 200.02, 395/200.09, 200.15; 370/85.2, 85.13, 92, 84.1, 235, 236, 230, 389, 392; 340/835.02

[56] References Cited

U.S. PATENT DOCUMENTS

| | | | |
|---|---|---|---|
| 4,894,823 | 1/1990 | Adelmann et al. | 370/60 |
| 5,343,463 | 8/1994 | van Tetering et al. | 370/13 |
| 5,481,539 | 1/1996 | Hershey et al. | 370/85.3 |
| 5,483,533 | 1/1996 | Kuba | 370/79 |
| 5,550,807 | 8/1996 | Kuroshita | 370/17 |
| 5,590,366 | 12/1996 | Bryant et al. | 395/800 |

*Primary Examiner*—Larry D. Donaghue
*Attorney, Agent, or Firm*—Oblon, Spivak, McClelland, Maier & Neustadt, P.C.

[57] ABSTRACT

A data transmission apparatus comprises a data receiving section, a memory section, an acquisition section, a comparison section, a determination section and a discard section. The comparison section compares transmission time period data consisting of an expected transmission time period read from the memory section and a present time point, with the receiving time limit of a packet acquired by the acquisition section. The determination section determines whether or not the packet will be received by a receiver of destination by the receiving time limit, on the basis of the comparison result. The discard section discards the packet if the determination section determines that the packet will not be received by the receiver of destination by the receiving time limit.

16 Claims, 7 Drawing Sheets

EXAMPLE OF DATA IN FIRST MEMORY SECTION 7

EXAMPLE OF DATA AT NODE N#3

| NODE NUMBER | ROUTE | EXPECTED TRANSMISSION TIME PERIOD | NEXT TRANSMISSION NODE | TRAFFIC JAM DATA |
|---|---|---|---|---|
| N#1 | 2,1 | 20 | 2 | 5 |
|  | 4,1 | 20 | 4 | 1 |
| N#2 | 2 | 10 | 2 | 5 |
|  | 4,1,2 | 30 | 3 | 8 |
| N#3 | null |  |  |  |
| N#4 | 4 | 10 | 4 | 1 |
|  | 2,1,4 | 30 | 2 | 5 |
| . | . | . | . | . |

FIG. 4

EXAMPLE OF DATA IN SECOND MEMORY SECTION 8

EXAMPLE OF DATA AT NODE N#3

| NODE NUMBER | OUTPUT PORT NUMBER |
|---|---|
| N#2 | 1 |
| N#4 | 2 |
| N#5 | 4 |
| HOST N#5 | 3 |

DATA TRANSMISSION METHOD AND APPARATUS APPLICABLE TO NETWORK SYSTEM

BACKGROUND OF THE INVENTION

1. Field of the Invention

This invention relates to data transmission method and apparatus applicable to a network system.

2. Description of the Related Art

Some network systems, such as a LAN, a WAN, etc., comprise nodes for performing data transmission control, host apparatuses respectively connected to the nodes, and transmission lines, such as communication cables, which connect the nodes to each other.

Figure 1:
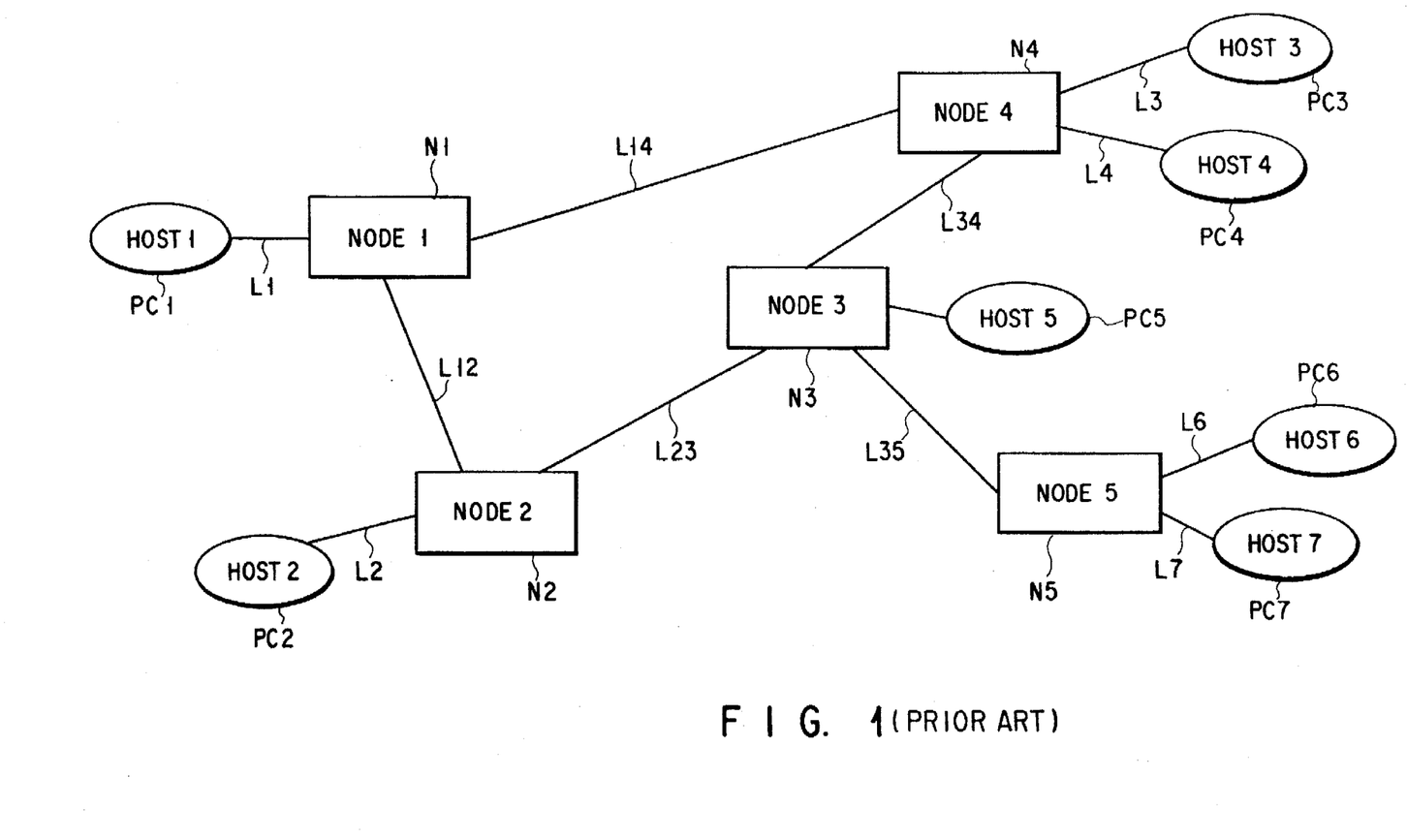
FIG. 1 is a view, showing an example of a conventional network system.

FIG. 1 shows a conventional network system of this type. As shown in FIG. 1, the network system has nodes N1–NN (only nodes N1–N5 are shown for convenience's sake), programmable controllers PC1–PCN (only controllers PC1–PC7 are shown) as host apparatuses, and transmission lines L1, L2, L3, . . . , L12 and L14.

When data transmission is necessary between the programmable controllers PC1–PCN, a sender-side programmable controller combines a header and main data into a data packet (which will be called simply "packet"). Hereinafter, suppose that each packet includes both data of a fixed length and data of a non-fixed length. The header includes address data, sender data, data indicative of the type of transmission data, and data indicative of the manner of processing at a destination. A receiver-side node issues a request for transmitting data to a sender-side node. When the sender-side node has received the request, it transmits a packet to an unoccupied transmission line in the network. The packet is transmitted to a programmable controller PC of destination via a single transmission line or a plurality of transmission lines.

The above-described network system can be used not only in a communication network but also in an automatic manufacturing factory. In the automatic manufacturing factory, various manufacturing machines are separately arranged along a manufacturing line, and controllers are installed for monitoring and controlling the machines. The network system is used to transmit various data between the controllers.

Other than the network system shown in FIG. 1, there are various types of network systems, such as a bus-type network system (e.g. ETHERNET (ISO IS8802.3); TOKEN BUS (ISO IS8802.4)) or a loop-type network system (e.g. TOKEN RING (ISO IS8802.5). Further, an ATM (Asynchronous Transfer Mode) has recently been highlighted. The ATM can increase the speed of data transmission and the efficiency of transmission lines in a network system. The ATM will be used even in an ISDN (Integrated Services Digital Network). The ATM performs communication using cells. Each cell is a 53-byte packet of a predetermined length, which consists of a header and a user data area of 48 bytes. In the ATM, each node has its dedicated switch, which is operated to switch transmission lines from one to another on the basis of transmission line data included in the header, in order to guide a cell transmitted to the switch through an inlet port, to an output port. The cell is transmitted to a destination as a result of switch operations by the switches of some nodes.

In the conventional network system, packet transmission is influenced by data communication requests which are momentarily issued in the system until it reaches a destination. Therefore, the packet is not necessarily transmitted to a destination within an expected period of time. If the packet is not transmitted within the expected time period, it cannot effectively be used. However, transmission of even a no more useful packet is continued in the network system until it reaches the destination. Such useless packets promote the traffic jam in the network system, and degrade the efficiency of the network system.

To avoid traffic jam in the network system, the ATM takes the following precaution:

When a host apparatus has issued a request for data transmission, the ATM determines, by negotiation, the amount of data which can be transmitted from the host apparatus per unit hour. If the host apparatus tries to transmit an excessive amount of cells, the ATM discards these cells to prevent traffic jam, thereby enabling host apparatuses connected to each other to use the network with high efficiency.

However, the ATM in which data transmission is performed within a communication capacity determined by the negotiation needs to set a communication rule based on the average value or the peak value of a communication amount. Unless occurrence of data can be roughly grasped beforehand, efficient data transmission cannot be expected. In the communication between controllers used in an automatic manufacturing factory, for example, requests for communication are issued at random. Therefore, it is difficult to apply, to the controllers, a system such as the ATM whose communication capacity is predetermined.

On the other hand, there is a network system which has a function for performing feedback communication to confirm transmission of data between a sender and a receiver of destination. In this system, however, if the receiver of destination (i.e. the last receiver to which data is transmitted) receives data after an expected time period elapses, it in turn transmits a useless confirmation signal to the sender. The sender, on the other hand, continues to monitor whether or not data transmission has succeeded, in order to confirm feedback communication. As a result, the start of the next operation is inevitably significantly delayed. Under the above-described circumstances, it is difficult to balance a monitoring time period for confirming whether the data transmission has succeeded, with a monitoring time period for reducing the delay of the start of the next operation.

Moreover, in the conventional network system, a single communication route is normally used to transmit data to each destination, even where the system has a plurality of communication routes for each destination. The line setting is performed, in most cases, statically. For example, when an abnormalilty has occurred on a present route, the route is for the first time changed to a substitution route.

Further, there is a public network which performs dynamic route change. In this case, however, the traffic jam of the overall network is relaxed by setting another route only in a predetermined time zone based on statistical data. Thus, the traffic jam relaxation does not depend upon the conditions of an individual packet.

SUMMARY OF THE INVENTION

It is the object of the invention to provide data transmission method and apparatus capable of relaxing the traffic jam of data transmission in a network system.

According to a first aspect of the invention, there is provided an apparatus for selectively transmitting, via a network, a packet including data concerning a receiving time limit by which the packet should be received by a receiver of destination, comprising:

means for determining whether or not the packet will be received by the receiver of destination by the receiving time limit, on the basis of the receiving time limit, an expected packet-transmission time period calculated from the receiving time limit, and a present time point; and means for discarding the packet when the determination means has determined that the packet will not be received by the receiver of destination by the receiving time limit, and transmitting the packet via the network when the determination means has determined that the packet will be received by the receiver of destination by the receiving time limit.

According to a second aspect of the invention, there is provided a communication system for selectively transmitting, between a network and a plurality of data transmission apparatuses connected to the network, a packet including data concerning a receiving time limit by which the packet should be received by a receiver of destination, comprising:

means for determining whether or not the packet will be received by the receiver of destination by the receiving time limit, on the basis of the receiving time limit, an expected packet-transmission time period calculated from the receiving time limit, and a present time point; and means for discarding the packet when the determination means has determined that the packet will not be received by the receiver of destination by the receiving time limit, and transmitting the packet via the network when the determination means has determined that the packet will be received by the receiver of destination by the receiving time limit.

According to a third aspect of the invention, there is provided a method for selectively transmitting, via a network, a packet including data concerning a receiving time limit by which the packet should be received by a receiver of destination, comprising the steps of:

determining whether or not the packet will be received by the receiver of destination by the receiving time limit, on the basis of the receiving time limit, an expected packet-transmission time period calculated from the receiving time limit, and a present time point; and discarding the packet when the determination means has determined that the packet will not be received by the receiver of destination by the receiving time limit, and transmitting the packet via the network when the determination means has determined that the packet will be received by the receiver of destination by the receiving time limit.

According to a fourth aspect of the invention, there is provided a method for selectively transmitting, between a network and a plurality of data transmission apparatuses connected to the network, a packet including data concerning a receiving time limit by which the packet should be received by a receiver of destination, comprising the steps of:

determining whether or not the packet will be received by the receiver of destination by the receiving time limit, on the basis of the receiving time limit, an expected packet-transmission time period calculated from the receiving time limit, and a present time point; and discarding the packet when the determination means has determined that the packet will not be received by the receiver of destination by the receiving time limit, and transmitting the packet via the network when the determination means has determined that the packet will be received by the receiver of destination by the receiving time limit.

According to a fifth aspect of the invention, there is provided a data transmission apparatus for transmitting, via a network, a packet including data concerning a receiving time limit by which the packet should be received by a receiver of destination, comprising:

data receiving means for receiving the packet transmitted via the network;

memory means for obtaining and storing an expected transmission time period required for the received packet to be transmitted to the receiver of destination;

acquisition means for acquiring the receiving time limit from the received packet;

comparison means for comparing transmission time period data consisting of the expected transmission time period read from the memory means and a present time point, with the receiving time limit acquired from the packet;

determination means for determining whether or not the packet will be received by the receiver of destination by the receiving time limit, on the basis of the comparison result obtained from the comparison means; and discard means for discarding the packet if the determination means determines that the packet will not be received by the receiver of destination by the receiving time limit.

According to a sixth aspect of the invention, there is provided a data transmission method for transmitting, via a network, a packet including data concerning a receiving time limit by which the packet should be received by a receiver of destination, comprising the steps of:

receiving the packet transmitted via the network;

obtaining and storing an expected transmission time period required for the received packet to be transmitted to the receiver of destination;

acquiring the receiving time limit from the received packet;

comparing transmission time period data consisting of the expected transmission time period read from the memory means and a present time point, with the receiving time limit acquired from the packet;

determining whether or not the packet will be received by the receiver of destination by the receiving time limit, on the basis of a comparison result obtained in the comparison step;

discarding the packet if it is determined that the packet will not be received by the receiver of destination by the receiving time limit; and transmitting the packet via the network if it is determined that the packet will be received by the receiver of destination by the receiving time limit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Figure 2:
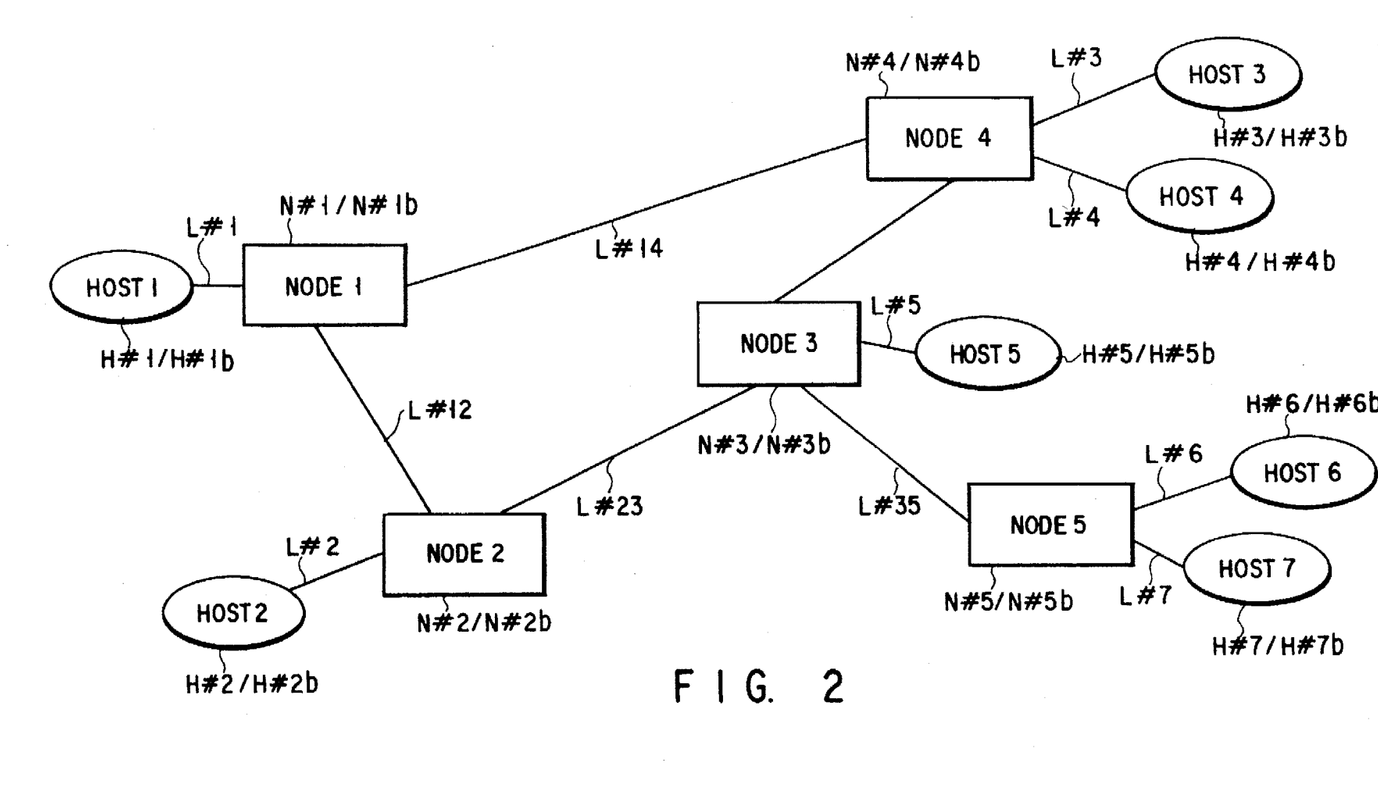
FIG. 2 a view, showing a data transmission apparatus according to an embodiment of the invention.

A network system to which a data transmission apparatus according to an embodiment of the invention is applied will be explained with reference to FIG. 2. As shown in FIG. 2, the network system comprises nodes N#1–N#N (only nodes N#1–N#5 are shown); host apparatuses H#1–H#NN (only host apparatuses H#1–H#7 are shown) connected to the nodes; and transmission lines L#1, L#2, L#3, ..., L#12, L#14..., such as communication cables, which connect the nodes to the host apparatuses or the nodes themselves. Further, signs N#n, H#n and L#n, which will appear later, denote a voluntary node, a voluntary host apparatus and a voluntary transmission line, respectively. Each of the host apparatus H#1–H#NN typically consists of a programmable controller, a personal computer, a work station or a large-scale computer.

At the time of data transmission, each host apparatus H#n combines main transmission data and peripheral data into a packet 1, and issues a request for transmission to a corresponding node N#n which is connected to the host apparatus H#n via a corresponding transmission line L#n. The peripheral data includes address data indicative of a destination, receiving time limit data indicative of a time limit by which data is to be received, priority data indicative of the priority of the processing of the packet 1, route selection data indicative of a transmission route to be used, and sender data indicative of a sender.

However, the host apparatus H#n may not include the priority data and the route selection data. In this case, it is considered that the priority is lowest, and no transmission line is predetermined.

Moreover, the peripheral data also includes data indicative of the type of the transmission data, data indicative of the manner of processing at the destination, etc. Each data included in the peripheral data may be contained in a header as employed in the ATM, or be inserted in the main transmission data.

Figure 3:
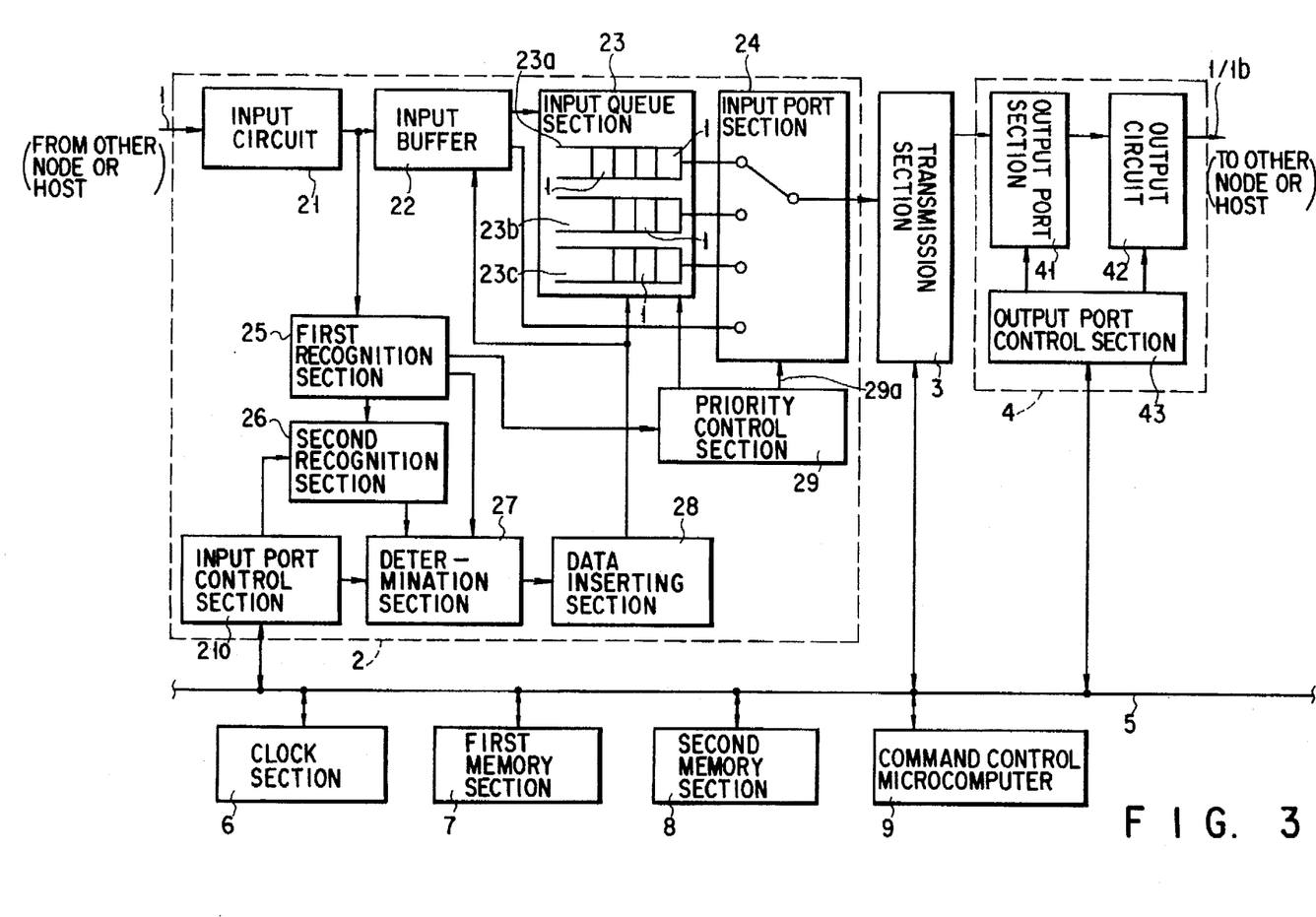
FIG. 3 is a block diagram, showing a node employed in the apparatus of FIG. 2.

FIG. 3 shows a node employed in the embodiment.

As is shown in FIG. 3, a voluntary node N#a of the nodes N#1–N#N has at least one input section 2 (only one input section is shown in FIG. 3) for receiving the packet 1 from another node N#n or a host apparatus H#n; at least one output section 4 (only one output section is shown in FIG. 3) for outputting the packet 1 to the destination, i.e. the node N#n or the host apparatus H#n; a transmission section 3 for transmitting the packet 1 from the input section 2 to the output section 4; and a common bus 5 connecting the above sections to each other.

The node N#a further has a clock section 6 connected to the common bus 5, a first memory section 7, a second memory section 8 and a microcomputer 9 for common control.

In the input section 2, the packet 1 is received by a signal receiving/inputting circuit 21, and stored in an input buffer 22. After once input to an input queue section 23, or directly from the input buffer 22, the packet 1 is transmitted to the output section 4 by means of the transmission section 3 via an input port section 24.

When the packet 1 is transmitted from the circuit 21 to the input buffer 22, a first recognition section 25 derives necessary data from the packet 1. A determination section 27 determines how to deal with the packet 1 on the basis of data from first and second recognition sections 25 and 26. In accordance with the determination result, a data inserting section 28 performs alteration of data, insertion of data, alteration of priority (alteration of order), etc.

The data derived by the first recognition section 25 is input to a priority control section 29, which in turn controls the queuing operation from the input buffer 22 to the input queue section 23, and the input port section 24 on the basis of the derived data.

The signal receiving/inputting circuit 21 is connected to a transmission line L#n connected to the node N#n or the host apparatus H#n, such that it can receive the packet 1.

The input buffer 22 has a memory buffer for storing the packet 1 received by the circuit 21. The buffer 22 can alter data stored in the memory buffer, using the data inserting section 28, and also can supply the stored data to the input queue section 23, or to the transmission section 3 via the input port section 24.

The input queue section 23 has at least one queue. In this embodiment, the input queue section 23 has three queues 23a, 23b and 23c of different processing priority classes. In accordance with the instruction of the priority control section 29, each queue 23x receives packets 1 of different priority degrees in the order of lower priority, and outputs them in the order of higher priority. Further, the input queue section 23 is arranged such that the contents of each packet 1 stored in each queue 23x can be altered by means of the data inserting section 28, and the packet can be moved in each queue 23x or between different queues 23x by means of the data inserting section 28.

During a usual operation, the input port section 24 performs switching of connection to transmit respective highest-priority packets 1 in the queues 23a, 23b and 23c to the transmission section 3 at a predetermined frequency in the order of priority of the queues. On the other hand, when the input port section 24 has received an input switching signal 29a from the priority control section 29, it performs switching of connection to transmit a packet 1 stored in the input buffer 22, to the transmission section 3. FIG. 3 shows an example of connection, wherein the queue 23a is connected to the transmission section 3.

The first recognition section 25 derives, from the received packet 1, each data included in a predetermined area of the packet, which is set and inserted by the sender host apparatus H#n or the node N#n on the route. That is, the section 25 derives the address data, the receiving time limit data, the priority class data, the route selection data and the sender data.

The second recognition section 26 derives, from the first memory section 7, data indicative of expected transmission time periods required to take necessary routes and data indicative of traffic jam, on the basis of the address data derived by the first recognition section 25. The necessary routes mean all routes leading from the present node N#a to another node N#x which is indicated by the address data and necessary for transmitting data to the host apparatus H#x of destination, or from the present node N#a to the host apparatus H#x of destination.

Figure 4:
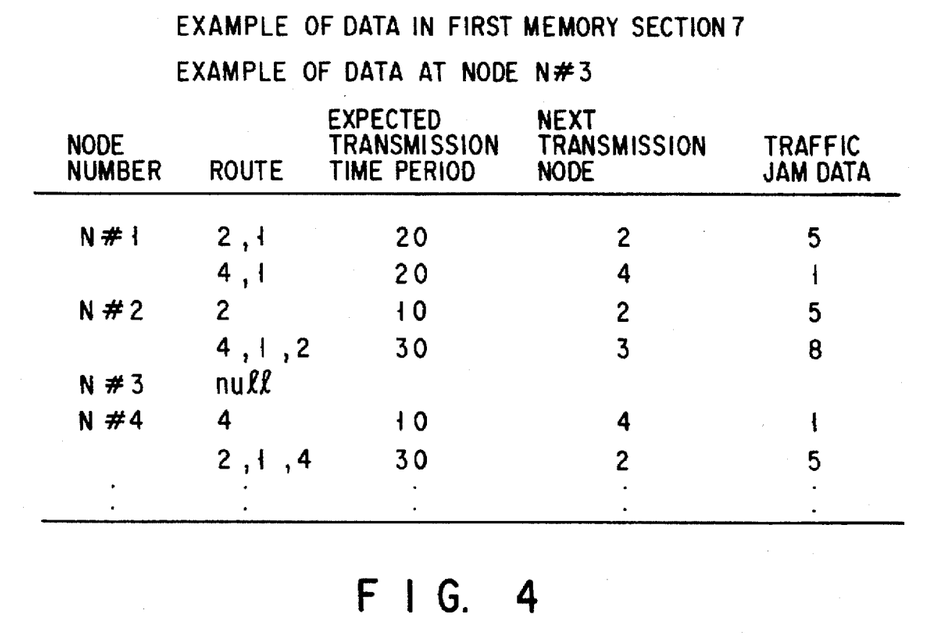
FIG. 4 is a table, showing data stored in a first memory unit employed in the apparatus of FIG. 2.

The first memory section 7 stores, as data necessary to obtain data on a route leading to the another node N#x (or the host apparatus H#x of destination), all routes leading to any node N#n other than the present node N#a, an expected transmission time period required to transmit data via each route, the next node corresponding to each route, traffic jam data, etc. For example, if the present node N#a is the node N#3, data as shown in FIG. 4 is stored.

The expected time period is calculated on the basis of each route and the performance of each node N#n and each transmission line L#n on the route, etc, or on the basis of the actual transmission time period of each route when no traffic jam occurs on the route. The traffic jam data indicates an index for obtaining a busy state of each route, or indicates a delay time at each node due to traffic jam. In the embodiment, data regarding the rate of processing at the next node is used as the traffic jam data.

Various data other than the above can be used as the traffic jam data. For example, the number of the packets 1 stored in the input queue section 23 of each node in each route may be used as the traffic jam data. Data on the priority class of each queue in the input queue section 23 may be included in the traffic jam data, as well as the number of the packets. Alternatively, the traffic jam data may be expected data calculated from route selection data, etc. included in a previously received packet or a presently received one.

The determination section 27 determines whether or not the packet 1 can be received by a receiving time limit, on the basis of the receiving time limit data, the route selection data and the sender data, which are read from the first recognition section 25, the expected transmission time data and traffic jam data of each route, which are read from the second recognition section 26, and present time data read from the clock section 6. On the basis of the determination, the section 27 outputs determination result data including a present-state-maintenance instruction, a route-change instruction, a priority class-designating instruction, a data-discard instruction, etc. Then, the section 27 calculates an expected delay time period by performing addition, subtraction, multiplication or division of an expected transmission time period and traffic jam data with the use of necessary coefficients, respectively. Moreover, the section 27 outputs an output port number corresponding to the next node N#n (or host apparatus H#n), on the basis of the determination result data and data stored in the second memory section 8.

The clock section 6 synchronizes the operations of all nodes and all host apparatuses within an allowable error range.

Figure 5:
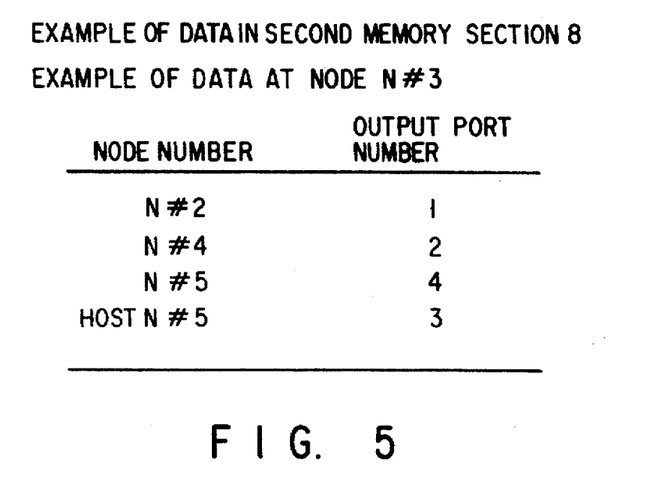
FIG. 5 is a table, showing data stored in a second memory unit employed in the apparatus of FIG. 2.

The second memory section 8 stores data on an output port connected to a transmission line L#ab between the present node N#a and the next node N#b, which is located on the route leading from the present node N#a to a target node N#x. FIG. 5 shows data and stored in the second memory section 8 of the node N#3.

On the basis of the determination result data output from the determination section 27 and an output port number corresponding to the next node N#n, the data inserting section 28 inserts output port number data and other necessary data into the packet 1 which still remains in the input buffer 22 or is already input to the input queue section 23, or alters those data.

The determination result data includes a priority class-designating instruction. Where the packet 1 is already input to any queue 23x of the input queue section 23, the data inserting section 28 can shift the packet 1 to that portion of the queue 23x which is designated by the priority class-designating instruction.

The priority control section 29 switches the input port section 24 such that the packet 1 in the input buffer 22 is transmitted to the transmission section 3, when the priority class data read from the first recognition section indicates the highest priority class. If, on the other hand, the data indicates other priority class, the control section 29 controls the input queue section 23 so as to input the packet 1 to a queue 23x corresponding to the designated priority class.

An input control section 210 comprises a schedule section for controlling the timing of the data transmission processing of each element in the node N#a and between elements located in the vicinity of the node, thereby controlling the generation of necessary timing signals, etc.

The transmission section 3 has a switch of a function for transmitting the packet 1 input from the input port section 24, to an output port section 41 corresponding to the next node N#b. This switch may consist of an ATM switch, an ETHERNET switch, an FDDI switch, etc.

The output section 4 comprises the output port section 41, a transmission signal output circuit 42 and an output section control section 43.

The output port section 41 has a memory element for temporarily buffering the packet 1 transmitted from the transmission section 3 and to be output from the present node N#a to the next node N#b on the route.

The transmission signal output circuit 42 is connected to another node N#n or a host apparatus H#n by means of a transmission line L#n, and transmits the packet in the output port section 41.

The output section control section 43 comprises a schedule section for controlling the timing of the data transmission processing of each element in the node N#a and between elements located in the vicinity of the node, thereby controlling the generation of necessary timing signals, etc.

The common control microcomputer 9 is constructed to perform those various control operations other than the above-described ones, which are necessary to operate the node N#a.

Figure 6:
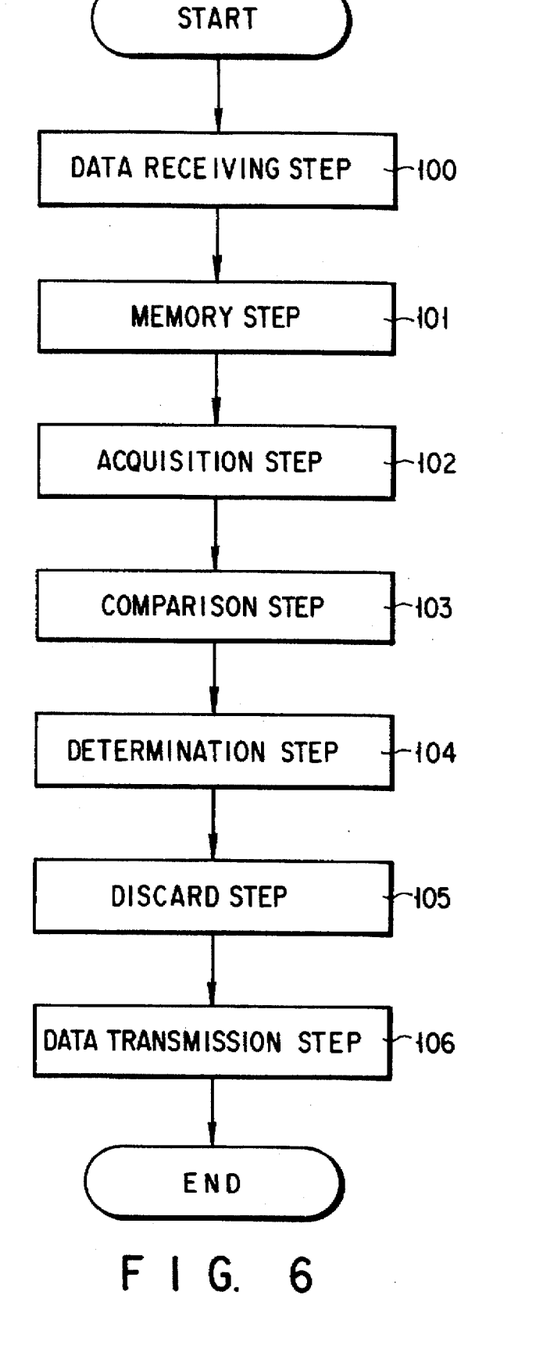
FIG. 6 is a flowchart, showing the gist of the operation of the invention.

The operation of the above-described data transmission apparatus employed in the network system and according to the invention will now be explained. Referring first to FIG. 6, the operation will be explained. The gist of the invention lies in a data transmission method for transmitting via a network a packet which includes a receiving time limit. This method includes a data receiving step 100, a memory step 101, an acquisition step 102, a comparison step 103, a determination step 104, a discard step 105, and a data transmission step 106.

In the data receiving step 100, a packet transmitted via the network is received. In the memory step 101, the expected transmission time period required to transmit the packet, received in the data receiving step 100, to a destination is obtained and stored. In the acquisition step 102, the receiving time limit by which the packet received in the data receiving step 100 should reach the destination is acquired from the packet. In the comparison step 103, travel time data, which indicates the expected travel time period of the packet read in the memory step 101 and the present time point, is compared with the receiving time limit acquired in the acquisition step 102. On the basis of the comparison result in the comparison step 103, it is determined in the determination step 104 whether or not the packet will be received by the host apparatus of destination by the receiving time limit. If it is determined in the determination step 104 that the packet will not be received by the receiving time limit, the packet is discarded in the discard step 105. If, on the other hand, it is determined in the determination step 104 that the packet will be received by the receiving time limit, the packet is transmitted via the network.

More specifically, in the network system of the embodiment, a voluntary host apparatus H#n combines, into the packet 1, the main transmission data, the address data, the time limit data, the priority class data, the route selection data and the sender data, thereby transmitting the packet 1 to a node N#n.

Then, in the input section 2 of the node N#n, the first recognition section 25 derives from the packet 1 the address data, the time limit data, the priority class data, the route selection data and the sender data.

If the priority class data indicates the highest priority class, the priority control section 29 generates a priority processing signal 29a to the input port section 24. The input port section 24, in turn, supplies the transmission section 3 with the packet 1 buffered in the input buffer 22 in preference to other packets. If, on the other hand, the priority class data indicates a priority class other than the highest one, the priority control section 29 controls the input queue section 23 so as to input the packet 1 to a corresponding queue 23x.

The address data included in the various data input to the first recognition section 25 is supplied to the second recognition section 26. On the basis of the supplied data, the second recognition section 26 selects all routes leading to the destination, and an expected transmission time period and traffic jam data corresponding to each route, thereby inputting the selected data to the determination section 27.

The determination section 27 performs determination on the basis of the data from the first and second recognition sections, and outputs the determination result.

The determination will be explained in more detail with reference to the flowchart of FIG. 7.

First, an expected delay time period for the presently designated route (or a predetermined static route where no particular route is designated) based on the route selection data is calculated from the expected transmission time period and the traffic jam data. A margin time period is calculated by subtracting, from the receiving time limit, the end point of the expected delay time period, as set from the present time. $\eta 1$=the margin time period/the expected delay time period, which is used as a parameter $\eta 1$, is calculated (ST1)

Thereafter, it is determined whether or not the parameter $\eta 1$ is larger than 1 (ST2). If $\eta 1 > 1$, a present-state-maintenance instruction concerning the route and the priority class is added to the determination result data (ST3).

If $\eta 1 \leq 1$, an expected delay time period for each possible route is calculated in the same manner as described above (ST4), thereby selecting, as a new route, a route with the shortest expected delay time period. A route-change instruction which enables the newly selected route to be set as the route selection data is added to the determination result data (ST5).

Then, a parameter $\eta 2$ (=the margin time period/the expected delay time period) for the newly selected route is calculated (ST6).

Subsequently, it is determined whether or not $\eta 2$ is larger than 1 (ST7). If $\eta 2 > 1$, a present-state-maintenance instruction concerning the priority class is added to the determination result data (ST8).

Moreover, the parameter $\eta 2$ is compared with a preset (or reset in accordance with the conditions) reference parameter $\beta$ for determining whether or not to discard data (ST9). If $\eta 2 \geq \beta$, a priority class-designating instruction to designate a necessary priority class is added to the determination result data (ST10). This embodiment employs four priority classes including a class for transmitting data directly from the input buffer 22. The lower value the parameter $\eta 2$ has, the higher priority class is assigned.

On the other hand, if $\eta 2 < \beta$, it is determined that the packet 1 cannot be received by the receiving time limit, and a data-discard instruction is added to the determination result data (ST11). The data-discard instruction includes an instruction to inform the sender of the fact that the packet 1 has been discarded, as well as an instruction to discard the packet 1. The data discard processing can be reported in various manners. In this embodiment, the report is realized by rewriting the packet 1 into a discard-reporting packet 1b by means of the data inserting section 27.

Figure 7:
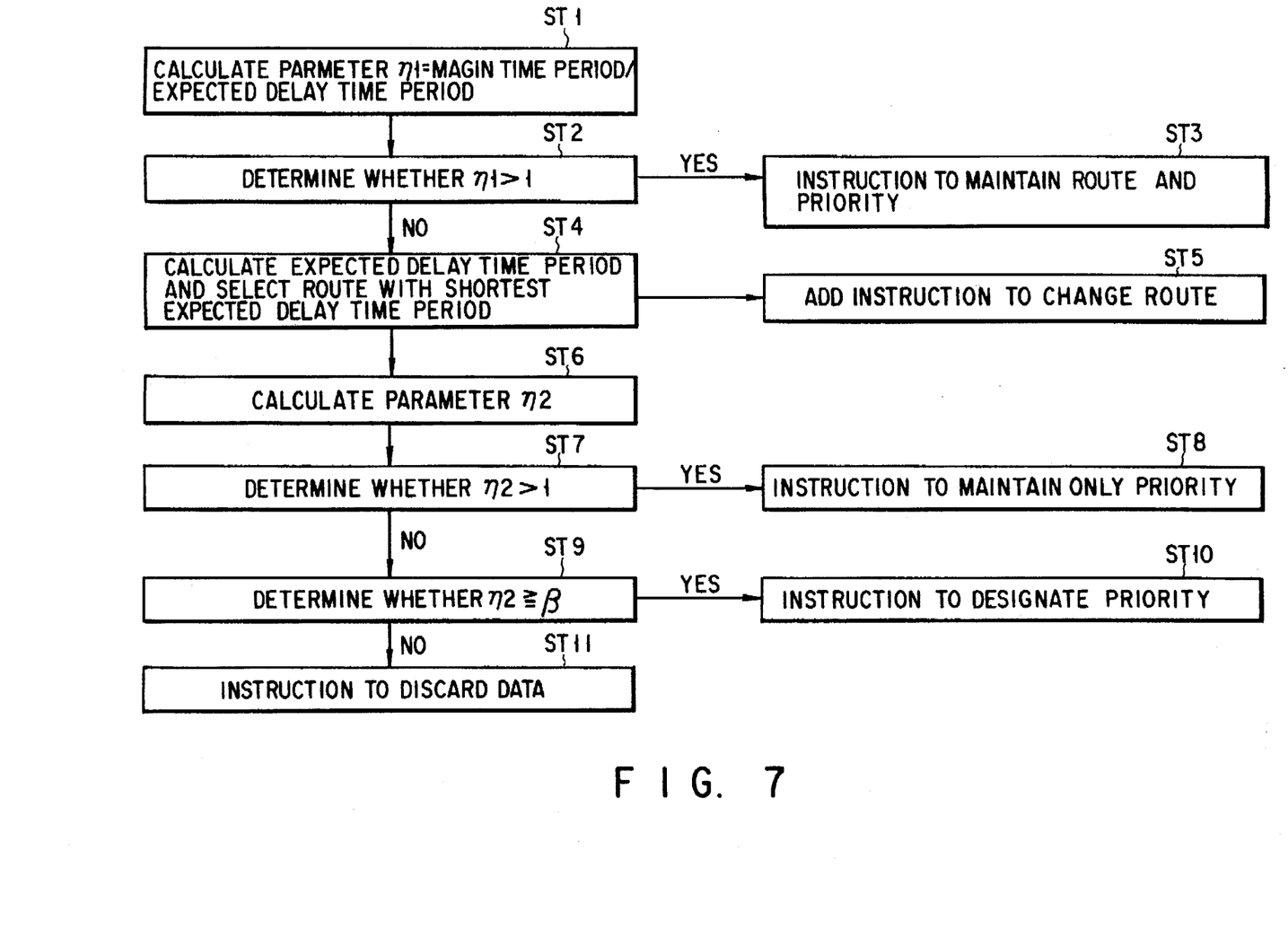
FIG. 7 is a flowchart, useful in explaining the preparation of determination result data in a determination section.

Since the FIG. 7 flowchart for preparing determination result data is just an example, a flowchart having steps of a different order (for example, the step ST2 is replaced with the step ST4, or the step ST4 with the step ST9), or a flowchart of a different conception may be used.

Since the next place to which the packet 1 is transmitted is determined after the preparation of the determination result data, the determination section 27 determines an output port number on the basis of the determination result data and the data stored in the second memory section 8.

The data inserting section 28 alters the contents of the packet 1 stored in the input buffer 22 or in the input queue section 23 on the basis of the determination result data, and inserts the output port number in the packet 1.

The alteration, etc. performed by the data inserting section 28 on the basis of the determination result data are as follows:

(1) If the present-state-maintenance instruction is issued concerning both the route and the priority class, no alteration is performed.

(2) If the route-change instruction is issued, the route selection data is altered to indicate a newly selected route.

(3) If the present-state-maintenance instruction is issued concerning the priority class, the priority class data is not altered.

(4) If the priority class-designating instruction is issued, the priority class data is altered to indicate the designated priority class. Further, where the packet 1 is already stored in a queue 23x in the input queue section 23, the order of the packet 1 is changed in accordance with the designated class. If the priority class of the packet 1 is altered to the highest one, the packet 1 is moved to a top portion of that one of the queues 23x from which the next transmission is performed.

(5) If the data-discard instruction is issued, the main transmission data is discarded. The packet 1 is rewritten into a discard-reporting packet 1b by modifying the packet 1 to include only confirmation data for reporting the discard of data, which consists of the determination result data and data examined by the determination section 27 through the process up to the data-discard determination.

Thus, the packet 1 is transmitted to the transmission section 3 after necessary data alteration, insertion of the output port number and priority processing, etc. are performed.

The transmission section 3 transmits the packet 1 to that output port section 41 of the output section 4 which corresponds to the inserted output port number. The packet 1 is then transmitted from the transmission signal output circuit 42 to the next node N#b or host apparatus H#b.

By virtue of the above-described structure and operation, the data transmission apparatus of the network system according to the embodiment provides the following advantages:

(1) The determination section 28 determines whether or not the packet 1 will be received by the receiving time limit, on the basis of the address data, the sender data and the receiving time limit which are included in the packet 1 and derived by the first recognition section 25, and also on the basis of the expected delay time period (i.e. the expected transmission time period and the traffic jam data) stored in the first memory section 7. If it is determined that the packet will not be received by the receiving time limit, the packet is discarded. Thus, any packet which is estimated to become useless is beforehand removed from the network, and hence meaningless traffic jam in the network can be relaxed, thereby realizing high speed transmission of data.

(2) In addition to the above-described structure and advantage, a packet including data concerning packet discard is transmitted to the sender at the time of discarding the packet 1. Therefore, the sender of the packet 1 can take a necessary measure by virtue of the discard-reporting packet.

Moreover, the above-described network system is considered a feedback network system for performing feedback communication between the sender of data and the receiver thereof. Since in the network system employed in the embodiment, it is determined in the stage of a node whether or not data will be transmitted in vain, the feedback communication can be performed very quickly. Accordingly, it suffices if the sender sets only a short monitor time period to monitor whether the presently-performed data transmission has succeeded or failed. As a result, the sender can perform a delicate monitor operation which enables a delay in the start of the next operation to be restrained.

(3) In addition to the structure and advantage mentioned in item (1), the network system is constructed such that the packet 1 includes priority class data; the determination section 28 can determine whether or not the packet 1 will be received by the receiving time limit if the priority class in the packet 1 is altered; and the priority class indicated by the priority class data of the packet 1 is raised if it is determined that the packet 1 will be received by the receiving time limit as a result of altering the priority class. By virtue of this structure, the number of packets which will become useless unless their priority classes are altered can be decreased, thereby increasing the speed of the data transmission in the network.

(4) In addition to the structure and advantage mentioned in item (1), the network system is constructed such that the packet 1 includes route selection data; the determination section 28 can determine whether or not the packet will be received by the receiving time limit if the route is changed; and the route is changed if the packet 1 can be received by the receiving time limit as a result of doing so. By virtue of this structure, the number of packets which will become useless unless their routes are changed can be decreased, thereby increasing the speed of the data transmission in the network.

(5) A multiplier effect can be obtained by combining the structures described in items (2) and (3), (2) and (4), (3) and (4), or (2), (3) and (4).

Furthermore, the data transmission apparatus and method employed in the network system, or the network system can realize, with the use of intelligent functions, programmable control of machines separately installed along the manufacturing line in an automatic manufacturing factory, or a central operating system employed therein. Further, they enable controllers for monitoring and operating the machines and the operating system to drive them to cooperate each other.

Figure 8:
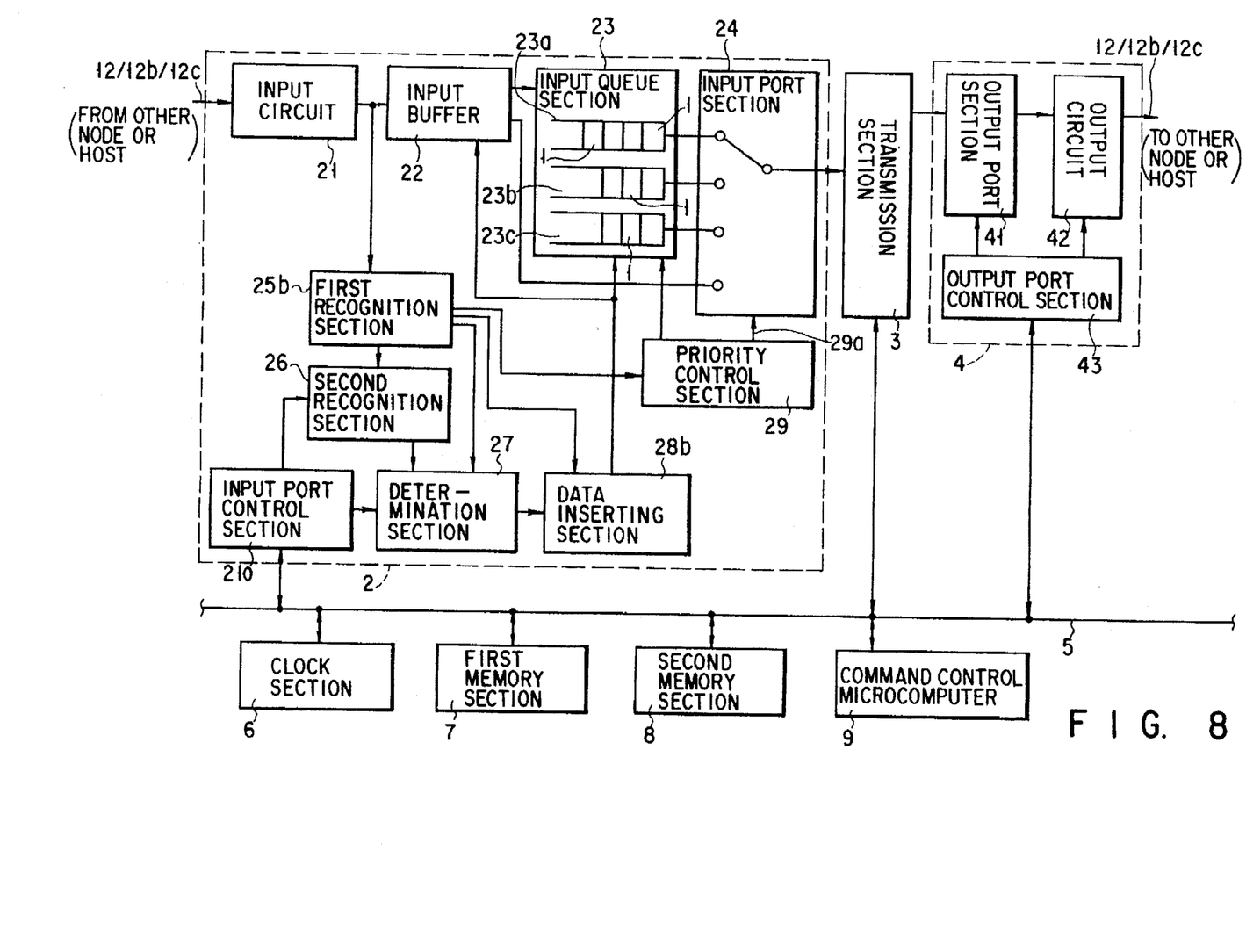
FIG. 8 is a data transmission apparatus according to another embodiment of the invention.

FIG. 8 shows a data transmission apparatus according to a second embodiment of the invention. In FIG. 8, elements similar to those in FIGS. 2 and 3 are denoted by corresponding reference numerals, and explanations will be given of only different elements.

In this embodiment, a voluntary host apparatus H#nb has a structure similar to that of the host apparatus H#n employed in the first embodiment, except that search data indicative of whether a packet 12 is identical to a search packet 12b or 12c is added to various data items included in the packet 12, and the transmission time point of the packet 12 is added to the data if the packet 12 is identical to the search packet 12b or 12c.

Further, in this embodiment, a first recognition section 25b has a structure similar to that of the first recognition section 25 employed in the first embodiment, except that it derives the search data from the packet 12 and outputs the search data and the address data to a data inserting section 28b.

If the data inserting section 28b recognizes, from the search data and address data supplied from the first recognition section 25b, that the packet 12 is identical to the search packet 12b or 12c and the present node N#ab is the destination of the search packet, the section 28b alters the contents of the packet 12 so that the packet can be returned to the sender. Further, the section 28b adds to the packet 12 data concerning the time point of processing at the node while the packet stays in the input buffer 22 of the node.

An operation of the data transmission apparatus employed in the network system and according to the second embodiment will now be explained.

The host apparatus H#nb transmits the search packet 12b after it adds to the packet priority class data indicative of the highest priority class. Then, the search packet 12b is transmitted to the transmission section 3 directly from the input buffer 22 (without passing the input queue section 23) in each node N#n until it reaches the node N#ab of destination.

When the search packet 12b has reached the node N#ab of destination, it has its contents altered by the data inserting section 28 so that it can be returned to the sender, and is simultaneously provided with data on the processing time point at the node.

Thus, the search packet 12b reciprocates between the sender and the destination in a time period as short as possible.

The transmission time period required to transmit data through the route leading from the sender to the destination is calculated from the difference between the time point at which the search packet 12b has reached the sender, and the processing time point at the node.

If the overall data length of the packet 12 is kept constant as in the case of an ATM, an extremely precise transmission time period can be obtained.

Using the thus-obtained precise transmission time period as the expected transmission time period in the first memory section 7 enables highly reliable estimation as to whether or not the packet 12 can be transmitted by the transmission time limit.

A second operation of the data transmission apparatus employed in the network system and according to the second embodiment will be explained.

The host apparatus H#ab transmits, to the node N#ab located adjacent thereto, a search packet 12c provided with priority class data indicative of a priority class whose traffic jam state is to be checked.

In the node N#ab, the packet 12 recognized as the search packet 12c has its contents altered by the data inserting section 28 so that it can be returned to the sender, and is simultaneously provided with data on the processing time point at the node.

The difference (difference 1) between the time point at which the search packet 12b has reached the sender, and the processing time point at the node is calculated. Further, the difference (difference 2) between the processing time point at the node and the transmission time point at the sender is calculated. Since the processing time period required at each of the signal receiving/inputting circuit 21, the input buffer 22, the transmission section 3 and the output section 4 is predetermined on the basis of its performance, the differences 1 and 2 are considered to reflect a traffic jam state at a queue 23x of a designated priority class in the node N#ab. Accordingly, traffic jam data for each priority class can be prepared by performing addition, subtraction, multiplication or division with respect to the differences 1 and 2, using coefficients determined from the performance of each of the apparatuses.

Since the thus-prepared traffic jam data reflects the actual traffic jam state, using the traffic jam data as the data in the first memory section 7 enables highly reliable estimation as to whether or not the packet 12 can be transmitted by the transmission time limit.

Traffic jam data even on a remote node can be examined, if the second operation of the second embodiment is modified such that the packet is transmitted with the highest priority at all midway nodes on the route between the sender and the destination, and is processed only at the node of destination in accordance with a priority class to be examined.

By virtue of the above-described structure and operation, the data transmission apparatus and method employed in the network system and according to the second embodiment can provide the following advantage:

In addition to the structures and advantages recited in items (1)–(5) in the first embodiment, if packets of a constant length are used as in the ATM system, a more accurate expected transmission time period and more accurate traffic jam data can be obtained. As a result, very accurate estimation can be performed with respect to the possibility of transmission can be performed, thereby establishing an efficient network system.

In the invention, the kind or structure of a packet to be transmitted is not particularly limited, but various kinds of packets can be used.

Further, in the embodiments, a constellation type network structure is employed as an example. It is a matter of course that the invention is applicable to an ATM network of a constellation type structure. However, the invention is not limited to a network system of a constellation type structure, but is also applicable to a structure in which nodes are linearly arranged, a structure in which nodes are annually arranged, etc.

As explained above, the invention can provide data transmission method and apparatus employed in a network system, which can perform data transmission so as to fit to conditions concerning the time limit of receiving each packet, and can relax the traffic jam in the network.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An apparatus for selectively transmitting, via a network, a packet including data concerning a receiving time limit by which the packet should be received by a receiver of destination, comprising:

means for determining whether or not the packet will be received by the receiver of destination by the receiving time limit, on the basis of the receiving time limit, an expected packet-transmission time period calculated from the receiving time limit, and a present time point; and means for discarding the packet when the determination means has determined that the packet will not be received by the receiver of destination by the receiving time limit, and transmitting the packet via the network when the determination means has determined that the packet will be received by the receiver of destination by the receiving time limit.

2. A communication system for selectively transmitting, between a network and a plurality of data transmission apparatuses connected to the network, a packet including data concerning a receiving time limit by which the packet should be received by a receiver of destination, comprising:

means for determining whether or not the packet will be received by the receiver of destination by the receiving time limit, on the basis of the receiving time limit, an expected packet-transmission time period calculated from the receiving time limit, and a present time point; and means for discarding the packet when the determination means has determined that the packet will not be received by the receiver of destination by the receiving time limit, and transmitting the packet via the network when the determination means has determined that the packet will be received by the receiver of destination by the receiving time limit.

3. The communication system according to claim 2, wherein at least one of the data transmission apparatuses includes:

the means for determining whether or not the packet will be received by the receiver of destination by the receiving time limit, on the basis of the receiving time limit, the expected packet-transmission time period calculated from the receiving time limit, and the present time point; and the means for discarding the packet when the determination means has determined that the packet will not be received by the receiver of destination by the receiving time limit, and transmitting the packet via the network when the determination means has determined that the packet will be received by the receiver of destination by the receiving time limit.

4. A method for selectively transmitting, via a network, a packet including data concerning a receiving time limit by which the packet should be received by a receiver of destination, comprising the steps of:

determining whether or not the packet will be received by the receiver of destination by the receiving time limit, on the basis of the receiving time limit, an expected packet-transmission time period calculated from the receiving time limit, and a present time point; and     discarding the packet when the determination step has determined that the packet will not be received by the receiver of destination by the receiving time limit, and transmitting the packet via the network when the determination step has determined that the packet will be received by the receiver of destination by the receiving time limit.

5. A method for selectively transmitting, between a network and a plurality of data transmission apparatuses connected to the network, a packet including data concerning a receiving time limit by which the packet should be received by a receiver of destination, comprising the steps of:

determining whether or not the packet will be received by the receiver of destination by the receiving time limit, on the basis of the receiving time limit, an expected packet-transmission time period calculated from the receiving time limit, and a present time point; and     discarding the packet when the determination step has determined that the packet will not be received by the receiver of destination by the receiving time limit, and transmitting the packet via the network when the determination step has determined that the packet will be received by the receiver of destination by the receiving time limit.

6. The method according to claim 5, wherein at least one of the data transmission apparatuses executes the step of determining whether or not the packet will be received by the receiver of destination by the receiving time limit, on the basis of the receiving time limit, the expected packet-transmission time period calculated from the receiving time limit, and the present time point; and the step of discarding the packet when the determination step has determined that the packet will not be received by the receiver of destination by the receiving time limit, and transmitting the packet via the network when the determination step has determined that the packet will be received by the receiver of destination by the receiving time limit.

7. A data transmission apparatus for transmitting, via a network, a packet including data concerning a receiving time limit by which the packet should be received by a receiver of destination, comprising:

data receiving means for receiving the packet transmitted via the network;

memory means for obtaining and storing an expected transmission time period required for the received packet to be transmitted to the receiver of destination;

acquisition means for acquiring the receiving time limit from the received packet;

comparison means for comparing transmission time period data consisting of the expected transmission time period read from the memory means and a present time point, with the receiving time limit acquired from the packet;

determination means for determining whether or not the packet will be received by the receiver of destination by the receiving time limit, on the basis of the comparison result obtained from the comparison means; and     discard means for discarding the packet if the determination means determines that the packet will not be received by the receiver of destination by the receiving time limit.

8. The data transmission apparatus according to claim 7, wherein the discard means has means for transmitting at least data indicative of the discard of the packet, to a sender of the packet when it discards the packet.

9. The data transmission apparatus according to claim 7, wherein the discard means has means for transmitting the packet via the network when the determination means has determined that the packet will be received by the receiver of destination by the receiving time limit.

10. The data transmission apparatus according to claim 7, wherein:

the packet includes data concerning the priority of data transmission;

the determination means has means for reading the data concerning the priority; and     the discard means has means for altering the priority read from the packet in accordance with predetermined conditions when a determination result concerning the receiving time limit of the packet meets with the predetermined conditions, in order to enable data transmission according to the priority read from the packet.

11. The data transmission apparatus according to claim 7, wherein:

the packet includes data concerning its schedule transmission route;

the determination means has means for reading the data concerning the schedule transmission route of the packet; and     the discard means has means for altering the schedule transmission route of the packet on the basis of data stored in the memory means and concerning an expected time period required for the packet to pass a possible transmission route, when a determination result concerning the receiving time limit of the packet meets with predetermined conditions.

12. A data transmission method for transmitting, via a network, a packet including data concerning a receiving time limit by which the packet should be received by a receiver of destination, comprising the steps of:

receiving the packet transmitted via the network;

obtaining and storing an expected transmission time period required for the received packet to be transmitted to the receiver of destination;

acquiring the receiving time limit from the received packet;

comparing transmission time period data consisting of the expected transmission time period read from the memory means and a present time point, with the receiving time limit acquired from the packet;

determining whether or not the packet will be received by the receiver of destination by the receiving time limit, on the basis of a comparison result obtained in the comparison step;

discarding the packet if it is determined that the packet will not be received by the receiver of destination by the receiving time limit; and     transmitting the packet via the network if it is determined that the packet will be received by the receiver of destination by the receiving time limit.

13. The data transmission method according to claim 12, wherein the discard step includes the step of transmitting at least data indicative of the discard of the packet, to a sender of the packet when the packet is discarded.

14. The data transmission method according to claim 12, wherein the discard step includes the step of transmitting the packet via the network when it is determined in the determination step that the packet will be received by the receiver of destination by the receiving time limit.

15. The data transmission method according to claim 12, wherein:

the packet includes data concerning the priority of data transmission;

the determination step includes the step of reading the data concerning the priority; and the discard step includes the step of altering the priority read from the packet in accordance with predetermined conditions when a determination result concerning the receiving time limit of the packet meets with the predetermined conditions, in order to enable data transmission according to the priority read from the packet.

16. The data transmission method according to claim 12, wherein:

the packet includes data concerning its schedule transmission route;

the recognition step includes the step of reading the data concerning the schedule transmission route of the packet; and the discard step includes the step of altering the schedule transmission route of the packet on the basis of data stored in the memory means and concerning an expected time period required for the packet to pass a possible transmission route, when a determination result concerning the receiving time limit of the packet meets with predetermined conditions.

* * * * *